United States Patent
Huebner et al.

(10) Patent No.: US 10,172,366 B2
(45) Date of Patent: Jan. 8, 2019

(54) "GENTLE TOUCH" MODIFIED ATMOSPHERE MEAT PACKAGING SYSTEM AND METHOD OF PACKAGING MEAT

(71) Applicant: JBS, USA Holdings, Inc., Greeley, CO (US)

(72) Inventors: Patrick Huebner, Greeley, CO (US); Chad Riley, Greeley, CO (US); Michael Swanson, Greeley, CO (US)

(*) Notice: Subject to any disclaimer, the term of this patent is extended or adjusted under 35 U.S.C. 154(b) by 0 days.

(21) Appl. No.: 15/184,304

(22) Filed: Jun. 16, 2016

(65) Prior Publication Data
US 2017/0360055 A1 Dec. 21, 2017

(51) Int. Cl.
*A23B 4/16* (2006.01)
*A23B 4/02* (2006.01)
(Continued)

(52) U.S. Cl.
CPC ............. *A23B 4/16* (2013.01); *A23B 4/00* (2013.01); *A23B 4/021* (2013.01); *A23L 1/31445* (2013.01); *B65B 7/16* (2013.01); *B65B 7/164* (2013.01); *B65B 25/001* (2013.01); *B65B 25/067* (2013.01); *B65B 31/00* (2013.01); *B65B 31/028* (2013.01); *B65B 61/22* (2013.01); *B65D 65/02* (2013.01); *B65D 75/32* (2013.01);
(Continued)

(58) Field of Classification Search
CPC .. A23B 4/16; A23B 4/00; A23B 4/021; B65B 7/16; B65B 7/164; B65B 25/001; B65B 25/067; B65B 31/00; B65B 31/028; B65B 61/22; B65D 65/02; B65D 75/32; B65D 81/2069; B65D 81/2076; B65D 81/264; B65D 81/28
See application file for complete search history.

(56) References Cited

U.S. PATENT DOCUMENTS 3,003,884 A   10/1961   Andrews
5,916,613 A    6/1999   Stockley, III
(Continued)

FOREIGN PATENT DOCUMENTS

EP    196799 A1   10/1986

*Primary Examiner* — Erik Kashinikow
*Assistant Examiner* — C A Smith
(74) *Attorney, Agent, or Firm* — Luke Charles Holst; McGrath North Mullin & Kratz, PC LLO

(57) ABSTRACT

The present invention relates in general to the field of packaged meat product, and more specifically, to a modified atmosphere meat packaging system and method of packaging meat product. The modified atmosphere meat packaging system and method comprises a lid-stock container with a reduced-volume headspace configured to contain a modified atmosphere consisting of carbon dioxide and nitrogen. Spices, salts, rubs and seasonings may be further placed on the meat product to add flavor and mask a myoglobin state during long periods of shipping, storage and retail display. An impermeable gaseous barrier is configured to "gently touch" the meat product to prevent movement inside the meat packaging system and maintain an attractive appearance to consumers. The purpose of the invention is to provide a packaged meat product that appears freshly cut and wrapped straight from the butcher at a local meat market as opposed to a centralized packaging facility.

11 Claims, 3 Drawing Sheets

(51) Int. Cl.

| | | |
|---|---|---|
| *A23L 1/314* | (2006.01) | |
| *B65B 7/16* | (2006.01) | |
| *B65B 25/00* | (2006.01) | |
| *B65B 31/00* | (2006.01) | |
| *B65D 65/02* | (2006.01) | |
| *B65D 81/20* | (2006.01) | |
| *B65D 81/28* | (2006.01) | |
| *A23B 4/00* | (2006.01) | |
| *B65D 75/32* | (2006.01) | |
| *B65D 81/26* | (2006.01) | |
| *B65B 25/06* | (2006.01) | |
| *B65B 31/02* | (2006.01) | |
| *B65B 61/22* | (2006.01) | |

(52) U.S. Cl.
CPC ..... *B65D 81/2069* (2013.01); *B65D 81/2076* (2013.01); *B65D 81/264* (2013.01); *B65D 81/28* (2013.01); *A23V 2002/00* (2013.01)

(56) References Cited

U.S. PATENT DOCUMENTS

| | | | |
|---|---|---|---|
| 5,989,610 | A | 11/1999 | Ruzek |
| 7,776,416 | B2 | 8/2010 | Kinard et al. |
| 7,935,373 | B2 | 5/2011 | Brackenridge et al. |
| 8,357,414 | B2 | 1/2013 | Becraft |
| 8,545,950 | B2 | 10/2013 | Siegel et al. |
| 8,623,479 | B2 | 1/2014 | Siegel et al. |
| 9,028,899 | B2 | 5/2015 | Etchells et al. |
| 2002/0063070 | A1* | 5/2002 | Stockley, III ......... B65B 31/025 206/213.1 |
| 2003/0054072 | A1* | 3/2003 | Merriman ................ A23B 4/16 426/124 |
| 2010/0266795 | A1* | 10/2010 | Pockat .................... A23B 4/18 428/35.7 |
| 2011/0229610 | A1 | 9/2011 | Roberge |
| 2013/0189409 | A1* | 7/2013 | Bell ........................ A23B 4/16 426/263 |
| 2014/0127374 | A1 | 5/2014 | Reynhout et al. |

* cited by examiner

"GENTLE TOUCH" MODIFIED ATMOSPHERE MEAT PACKAGING SYSTEM AND METHOD OF PACKAGING MEAT

FIELD OF THE INVENTION

The present invention relates in general to the field of packaged meats, and more specifically, to a modified atmosphere meat packaging system and method of packaging meat product. The purpose of the invention is to provide a meat packaging system and method of packaging meat product that extends shelf life for up to thirty (30) days. An additional purpose of the invention is to provide a packaged product that appears freshly cut and wrapped straight from the butcher at a local meat market as opposed to a centralized packaging facility. The meat packaging system is further designed to prevent meat product from slipping inside the package to maintain its attractive appearance.

BACKGROUND OF THE INVENTION

During the summer, families often flock to their local butcher to select choice cuts of meat for grilling, potlucks and barbeques. However, many grocery stores and supermarkets today have foregone the classic in-house butcher that cuts and wraps fresh meat personally for their customers. Instead, meat products are typically packaged miles-away by meat processors in case-ready packages and shipped to the grocery stores and supermarkets. Centralized packaging has grown in popularity because of its significant cost savings to retailers and enhanced quality control. In particular, centralized packaging reduces the chances of cross-contamination as the product leaves a federally inspected plant in a sealed package and isn't opened until the consumer takes the product home. Case-ready meats also offer retailers an improved ability to keep meat products consistently in-stock for their customers. Centralized packaging thus requires less labor, equipment and valuable overhead for retailers. However, problems arise during long shipping periods as meat decays as soon as it is butchered. When deprived of oxygen meat turns a purplish color, wherein overexposure turns meat brown. Although the meat product may remain fresh and edible, discoloration can be unappealing to consumers. Indeed, consumers regard bright red meat as fresh and will often make purchasing decisions based on appearance alone.

Current meat packaging systems often rely upon lid-stock packages with modified atmospheres to maintain the fresh appearance of meat, inhibit odors and improve shelf life. Lid-stock packages utilize a plastic container with a deep cavity for holding the meat product. An elastomeric sealing film comprised of cellophane, PVC, polyethylene or other plastic materials/blends that may be heat-sealed over the container, wherein the sealing film is transparent to allow the consumer to view the meat product inside. Prior to securing the sealing film to the container, the air is generally evacuated from the package using a vacuum chamber. The evacuated package is then back-flushed with a combination of gases before securing the sealing film to the container. The combination of gases typically comprise high-oxygen or low-oxygen modified atmospheres.

High-oxygen modified atmospheres typically range between 20-40% carbon dioxide and 60-80% oxygen. High amounts of oxygen give the meat product an appealing bright-red color, while the addition of moderate amounts of carbon dioxide reduces the growth of aerobic spoilage microorganisms. Even with moderate amounts of carbon dioxide, shelf life is limited to approximately 5-15 days. Thus, the use of high-oxygen modified atmosphere packages is best suited for meat product held for short periods of time. On the other hand, low-oxygen modified atmosphere packages are aimed at meat product that must be transported long distances or stored for several weeks. Low-oxygen modified atmospheres may utilize low amounts of oxygen along with a mixture of other gases including carbon monoxide, carbon dioxide and nitrogen. However, without the presence of oxygen the meat turns a purplish color that is undesirable to consumers. For this reason meat is often packaged, shipped and stored in low-oxygen modified atmosphere to extend shelf-life, and then displayed to customers in a high-oxygen environment to create an appealing bright-red bloom in the meat.

The problem with both high-oxygen and low-oxygen modified atmospheres are that they require a significantly large package with a high-volume headspace between the meat product and the sealing film. In particular, the gas volume of the headspace should be at least as great as the volume of the meat product inside the package. The high-volume headspace is necessary to provide room for the gasses that keep the meat fresh during shipping, storage and retail display. At lower headspace volumes the meat will develop an unattractive color and odor within fifteen days or less in high oxygen modified atmospheres. Unfortunately, these larger packages raise shipping, storage and refrigeration costs for both producers and retailers. High-volume headspaces also allow meat to slip inside the modified atmosphere packages which damages the meat product, smears the transparent sealing film to reduce visibility, and harms the overall appearance of the package to consumers. Moreover, savvy consumers recognize that meat products contained in packages with high-volume headspaces may have been cut miles away at a centralized packaging facility, instead of being freshly cut by an in-house butcher at the grocery store. Thus, modified atmosphere packaging with high-volume headspace may be unappealing to some consumers.

Thus, a desire remains to develop a modified atmosphere meat packaging system and method of packaging meat product that appears freshly cut and wrapped straight from the butcher at a local meat market. A desire also remains to develop a modified atmosphere meat packaging system and method of packaging meat product that reduces high-volume headspace currently required in present meat packaging systems. A further desire remains to develop a modified atmosphere meat packaging system and method of packaging meat product that is designed to prevent the meat product from slipping inside of the package to maintain its attractive appearance.

BRIEF SUMMARY OF THE INVENTION

Therefore, it is a principal object, feature, and/or advantage of the present invention to overcome the aforementioned deficiencies in the art and provide a modified atmosphere meat packaging system and method of packaging meat product.

Another object, feature, and/or advantage of the present invention is to provide a modified atmosphere meat packaging system and method of packaging meat product that is compatible with pork, beef, poultry, mutton, lamb, veal and other types of meats.

Yet another object, feature, and/or advantage of the present invention is to provide a modified atmosphere meat packaging system and method of packaging meat product that is convenient and easy to use by centralized packaging facilities and/or local in-house butchers.

A further object, feature, and/or advantage of the present invention is to provide a modified atmosphere meat packaging system and method of packaging meat product that extends shelf life of the meat for up to thirty (30) days.

A still further object, feature, and/or advantage of the present invention is to provide a modified atmosphere meat packaging system and method of packaging meat product that appears freshly cut and wrapped straight from the butcher at a local meat market.

Another object, feature, and/or advantage of the present invention is to provide a modified atmosphere meat packaging system and method of packaging meat product that is designed to prevent meat from slipping inside the package to maintain its attractive appearance.

Yet another object, feature, and/or advantage of the present invention is to provide a modified atmosphere meat packaging system and method of packaging meat product that utilizes carbon dioxide and nitrogen.

A further object, feature, and/or advantage of the present invention is to provide a modified atmosphere meat packaging system and method of packaging meat product that does not utilize oxygen and/or carbon monoxide.

A still further object, feature, and/or advantage of the present invention is to provide a modified atmosphere meat packaging system and method of packaging meat product that reduces the growth of aerobic spoilage microorganisms.

Another object, feature, and/or advantage of the present invention is to provide a modified atmosphere meat packaging system and method of packaging meat product that maintains an attractive coloration of the meat that is desirable to consumers.

Yet another object, feature, and/or advantage of the present invention is to provide a modified atmosphere meat packaging system and method of packaging meat product that may utilize spices, salts, sauces and natural flavorings on the meat to maintain its attractive appearance and coloration.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a modified atmosphere meat packaging system is provided. The modified atmosphere meat packaging system includes a lid-stock container with an impermeable or low-permeable gaseous barrier and a reduced-volume headspace. The reduced-volume headspace is configured to contain a modified atmosphere consisting of carbon dioxide and nitrogen to reduce the growth of aerobic spoilage microorganisms on meat product sealed inside the lid-stock container. Spices, salts, rubs and seasonings may be further placed on the meat product to prevent it from turning a purplish color during long periods of shipping, storage and retail display. The impermeable gaseous barrier is configured to "gently touch" the meat product to prevent movement inside the lid-stock container and maintain an attractive appearance to consumers.

According to another aspect of the present invention a method of packaging meat product is provided. The method comprises providing a modified atmosphere meat packaging system. The method further comprises providing meat product such as pork, beef, poultry, mutton, lamb, veal and other types of meats. Spices, salts, rubs and seasonings may be placed on the meat product to prevent it from turning a purplish color during long periods of shipping, storage and retail display. The method further comprises placing the meat product inside the meat packaging system, wherein air is evacuated and then back-flushed with a modified atmosphere consisting of carbon dioxide and nitrogen. The modified atmosphere is configured to keep meat product fresh during periods of shipping, storage and retail display. The modified atmosphere and meat product are effectively sealed inside the meat packaging system via an impermeable or low-permeable gaseous barrier. The impermeable or low-permeable gaseous barrier is configured to "gently touch" the meat product to prevent movement inside the meat packaging system and maintain an attractive appearance to consumers.

Different aspects may meet different objects of the invention. Other objectives and advantages of this invention will be more apparent in the following detailed description taken in conjunction with the figures. The present invention is not to be limited by or to these objects or aspects.

DESCRIPTION OF FIGURES

FIG. 1 is a cross-sectional view of a traditional packaged meat product with a high-volume headspace.

FIG. 2 is a cross-sectional view of a modified atmosphere meat packaging system of the present invention with a reduced-volume headspace.

FIG. 3 is a top-plan view of the modified atmosphere meat packaging system of the present invention of FIG. 2.

FIG. 4 is flow-chart of a method of packaging meat using the modified atmosphere meat packaging system of the present invention.

DETAILED DESCRIPTION OF THE INVENTION

Figure 1:
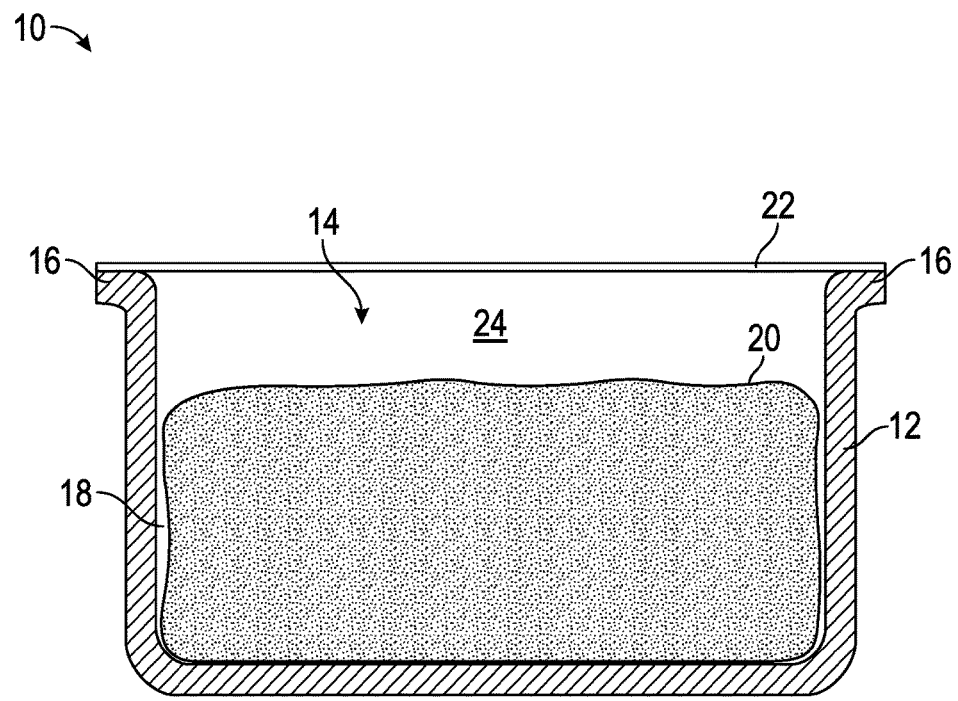
FIGS. 1-4 represent examples of a modified atmosphere meat packaging system of the present invention, and a method of packaging meat product using the modified atmosphere meat packaging system of the present invention.

FIG. 1 illustrates a cross-sectional view of a traditional packaged meat product (10) currently used in the centralized packaging industry. The traditional packaged meat product (10) typically comprises a lid-stock container (12). The lid-stock container (12) may include an opening (14), a peripheral edge (16) surrounding the opening (14), and a deep cavity (18) for the placement of meat product (20) inside the container (12). As used herein, the terms "meat(s)" or "meat product(s)" refer to the flesh of an animal used as food including pork, beef, poultry, mutton, lamb, veal and other types of meats. The lid-stock container (12) may further comprise a transparent barrier such as a sealing film (22). The lid-stock container (12) and the sealing film (22) may be formed of materials having low gas permeability that inhibit or prevent gases from transferring into and/or out of the packaged meat product (10). Alternatively, the sealing film (22) may be permeable to gasses, particularly oxygen, to allow the meat product (20) to bloom an attractive bright-red color. Once the meat product (20) is placed inside the deep cavity (18), the sealing film (22) may be bonded directly to the peripheral edge (16) of the lid-stock container (12) via heat-sealing or other means standard in the industry.

As shown in FIG. 1, the traditional packaged meat product (10) comprises a high-volume headspace (24) configured to contain high-oxygen or low-oxygen modified atmospheres. Notably, the high-volume headspace (24) prevents the sealing film (22) from contacting the meat product (20) inside the deep cavity (18) of the lid-stock container (12). Conventional packaging techniques dictate that the high-volume headspace (24) should be greater in volume than that of the meat product (20) packaged inside the lid-stock container (12). It is commercially understood that a high-volume headspace (24) is necessary to contain a sufficient amount of modified atmosphere to prevent spoilage and maintain an attractive coloration in the meat product (20) during periods of shipping, storage and retail display.

Figure 2:
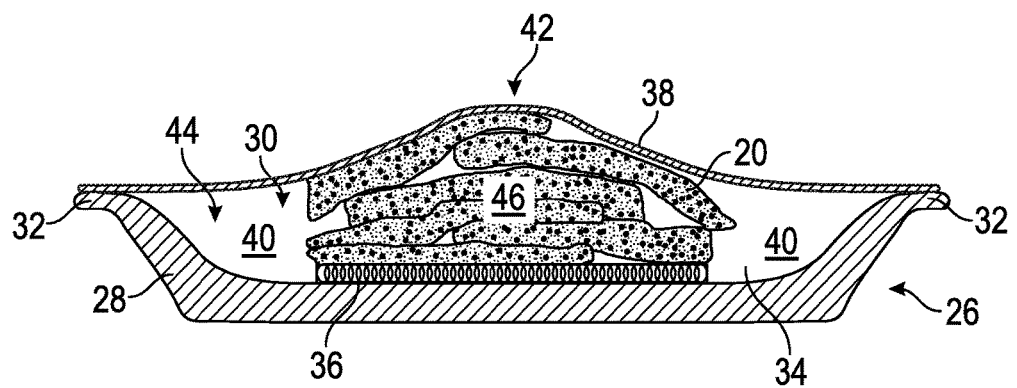

Illustrated in FIG. 2 is cross-sectional view of a modified atmosphere meat packaging system of the present invention (26). The meat packaging system (26) comprises a lid-stock container (28). The lid-stock container (28) may be formed of conventional food grade plastics and/or foams (e.g., molded polyester, polystyrene, polypropylene, or combinations thereof). The lid-stock container (28) may include an opening (30), a peripheral edge (32) surrounding the opening (30), and a depression (34) for the placement of meat product (20) inside the container (28). The lid-stock container (28) may be rigid or semi-rigid in order to support meat product (20) therein, the container (28) having a thickness of approximately 10-50 mils. The lid-stock container (28) may optionally comprise an absorbent pad (36) standardly used in the industry. The absorbent pad (36) may rest inside the depression (34) and the meat product (20) placed thereon, wherein the absorbent pad (36) is configured to absorb liquids (e.g., juices, blood, water, etc.) exuded from the meat product (20) during shipping, storage and retail display. The lid-stock container (28) may further comprise a barrier over the opening (14) such as a sealing film (38). The sealing film (38) may have a thickness of approximately 3 mils or less and be comprised of flexible, food-grade plastic film(s) (e.g., CVP, polypropylene, vinylidene chloride copolymers (saran), nylon, polyethylene terephthalate, ethylene/vinyl alcohol copolymer, silicon oxides, or combinations thereof). Once the meat product (20) is placed inside the depression (34), the sealing film (38) may be conformably bonded to at least the peripheral edge (32) of the lid-stock container (28). Bond-strength ranges may be approximately 0.001 to 2.5 pounds per inch. In particular, the sealing film (38) may be placed over the opening (14) and bonded via heat-sealing or other means standard in the industry. The sealing film (38) may be translucent or semi-translucent to allow consumers to view meat product (20) packaged inside the sealed, lid-stock container (28). The lid-stock container (28) and the sealing film (38) may be formed of materials having low gas permeability that inhibit or prevent gases from transferring into and/or out of the meat packaging system (26). In particular, the gas permeability of the lid-stock container (28) and the sealing film (38) may be less than about 100 cc/m$^2$/24 hr.

As shown in FIG. 2, the modified atmosphere meat packaging system (26) of the present invention comprises a reduced-volume headspace (40). The reduced-volume headspace (40) is commercially advantageous to both producers and retailers in that it lowers costs and permits a greater utilization of shipping, storage and retail display space. Furthermore, the reduced-volume headspace (40) in combination with the depression (34) of the lid-stock container (28) allows the meat product (20) to extend above the peripheral edge (32). Thus, the sealing film (38) "gently touches" (42) or contacts the meat product (20) to prevent movement of the meat product (20) inside the lid-stock container (28). The "gentle touch" feature (42) is defined as the sealing film (38) stretching tightly over and contacting the meat product (20) and further compressing the meat product (20) against the lid-stock container (28) to prevent the meat product (20) from slipping inside the depression (34) during shipping, storage, and retail display to maintain an attractive appearance for consumers. In particular, the reduced-volume headspace (40) and "gentle touch" feature (42) of the present invention are configured to resemble meat packaging used by in-house butchers at local meat markets. Thus, the modified atmosphere meat packaging system (26) is designed to appeal to consumers who desire freshly cut meat(s) as compared to centralized packaging facilities.

Figure 3:
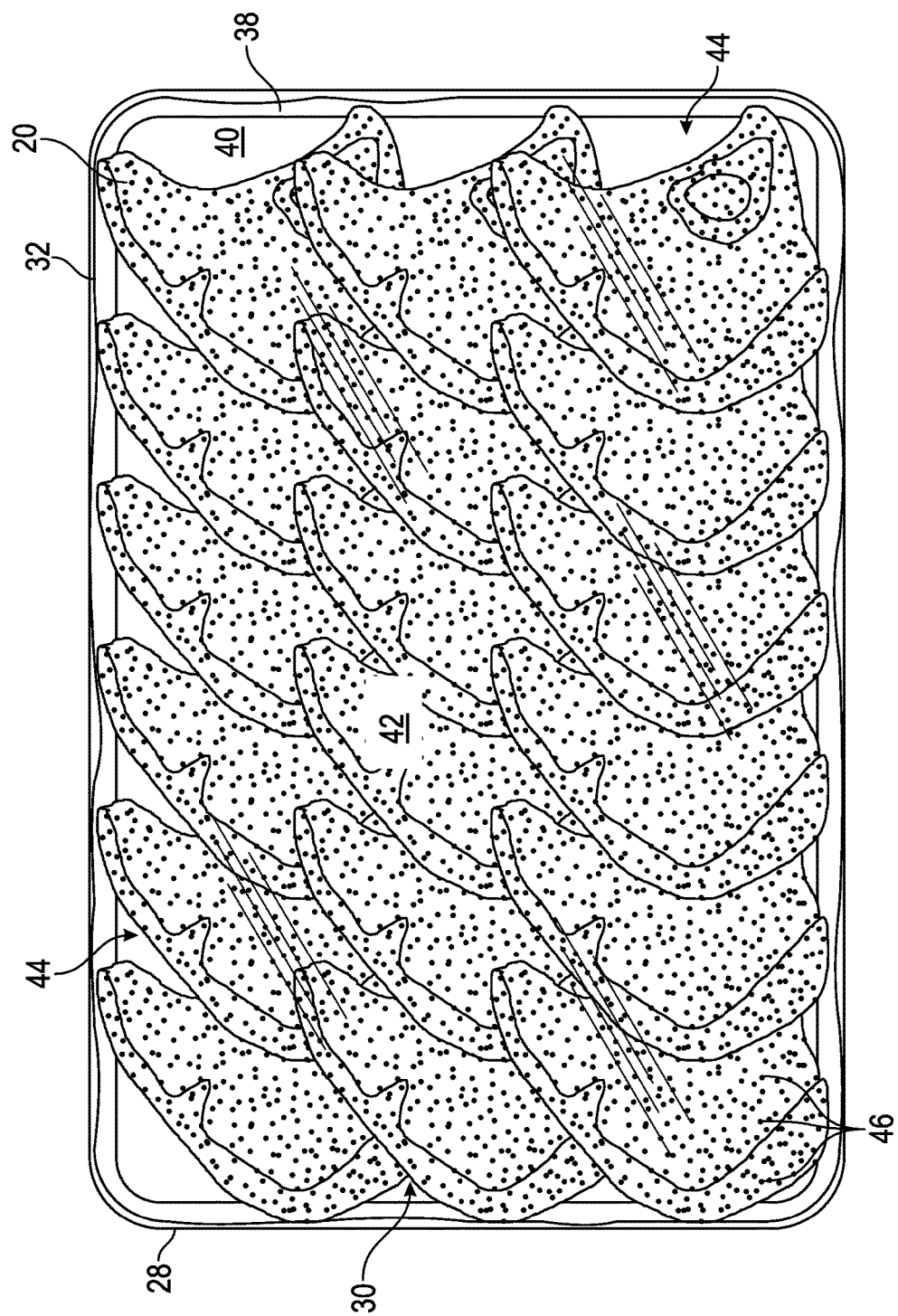

Illustrated in FIG. 3, the reduced-volume headspace (38) of the modified atmosphere meat packaging system (26) is configured to contain a modified atmosphere (44). In particular, the modified atmosphere (44) consists of approximately 50-70% carbon dioxide and 30-50% nitrogen. The modified atmosphere (44) consisting of carbon dioxide and nitrogen is configured to keep meat product (20) fresh during periods of shipping, storage and retail display. The modified atmosphere (44) does not contain oxygen or carbon monoxide, as the presence of oxygen increases the growth of aerobic spoilage microorganisms and the use of carbon monoxide may mask visual evidence of spoilage. The modified atmosphere meat packaging system (26) may further comprise spices, salts, rubs and seasonings (46) placed on an entire surface of the meat product (20) or portions thereof. In particular, the spices, salts, rubs and seasonings (46) may be placed in between the sealing film (38) and the meat product (20). The spices, salts, rubs and seasonings (46) provide a great eating experience for the consumer and further provide an appealing seasoned appearance for the meat product (20). The spices, salts, rubs and seasonings (46) prevent the meat product (20) from turning a purplish color during long periods of shipping, storage and retail display to mask the myoglobin state (non-oxygenated) of the cut meat inside the modified atmosphere (44). Thus, the reduced-volume headspace (40) of the present invention—in combination with the modified atmosphere (44) and spices, salts, rubs and seasonings (46)—provide a compact meat packaging system (26) that delivers a fresh meat product (20) with an attractive coloration for up to thirty days after packaging.

Figure 4:
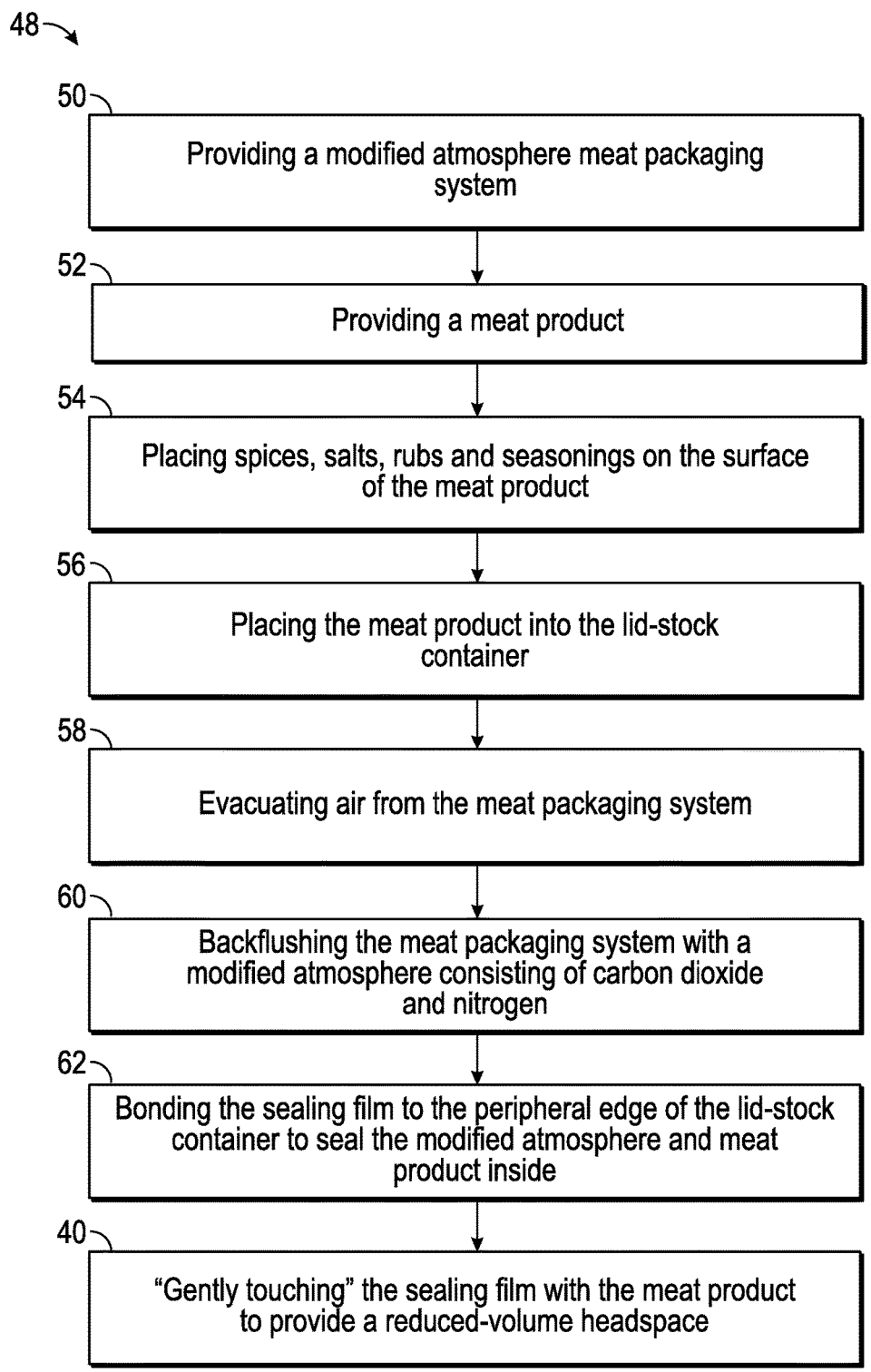

FIG. 4 illustrates another aspect of the present invention comprising a method (48) of packaging meat product (20). The method (48) of packaging meat product (20) comprises providing (50) a modified atmosphere meat packaging system (26). See FIGS. 2-3. The modified atmosphere meat packaging system (26) comprises a lid-stock container (28). The lid-stock container (28) may be formed of conventional food grade plastics and/or foams (e.g., molded polyester, polystyrene, polypropylene, or combinations thereof). The lid-stock container (28) may include an opening (30), a peripheral edge (32) surrounding the opening (30), and a depression (34) for the placement of meat product (20) inside the container (28). The lid-stock container (28) may be rigid or semi-rigid in order to support meat product (20) therein, the container (28) having a thickness of approximately 10-50 mils. The lid-stock container (28) may optionally comprise an absorbent pad (36) standardly used in the industry. The absorbent pad (36) may rest inside the depression (34) and is configured to have meat product (20) placed thereon, wherein the absorbent pad (36) absorbs liquids (e.g., juices, blood, water, etc.) exuded from the meat product (20) during shipping, storage and retail display. The lid-stock container (28) may further comprise a barrier such as a sealing film (38). The sealing film (38) may have a thickness of approximately 3 mils or less and be comprised of flexible, food-grade plastic film(s) (e.g., CVP, polypropylene, vinylidene chloride copolymers (saran), nylon, polyethylene terephthalate, ethylene/vinyl alcohol copolymer, silicon oxides, or combinations thereof).

As shown in FIG. 4, the method of packaging meat (48) comprises providing (52) meat product (20) such as pork, beef, poultry, mutton, lamb, veal and other types of meats. Spices, salts, rubs and seasonings (46) may be placed (54) on an entire surface of the meat product (20) or portions thereof. In particular, the spices, salts, rubs and seasonings (46) may be placed in between the sealing film (38) and the meat product (20). The spices, salts, rubs and seasonings (46) provide a great eating experience for the consumer and further provide an appealing seasoned appearance for the meat product (20). The spices, salts, rubs and seasonings (46) prevent the meat product (20) from turning a purplish color during long periods of shipping, storage and retail display to mask the myoglobin state (non-oxygenated) of the cut meat inside a modified atmosphere (44). The method (48) further comprises placing (56) the meat product (20) inside the depression (34) of the lid-stock container (28) via the opening (14), wherein the meat product (20) may be also placed on top of the absorbent pad (36) if utilized. In particular, the meat product (20) may extend above the peripheral edge (32) of the lid-stock container (28) when placed inside the depression (34). See FIGS. 2-3. The method (48) further comprises evacuating air (58) from the meat packaging system (26) using means standard in the industry (e.g., vacuum). The evacuated meat packaging system (26) may then be back-flushed (60) with the modified atmosphere (44). In particular, the modified atmosphere (44) consists of approximately 50-70% carbon dioxide and 30-50% nitrogen. The modified atmosphere (44) consisting of carbon dioxide and nitrogen is configured to keep meat product (20) fresh during periods of shipping, storage and retail display. The modified atmosphere (44) does not contain oxygen or carbon monoxide, as the presence of oxygen increases the growth of aerobic spoilage microorganisms and the use of carbon monoxide may mask visual evidence of spoilage.

As further shown in FIG. 4, the sealing film (38) may be conformably bonded (62) to at least the peripheral edge (32) of the lid-stock container (28) after the meat packaging system (26) has been back-flushed (60) with the modified atmosphere (44). In particular, the sealing film (38) may be placed over the opening (14) and bonded via heat-sealing or other means standard in the industry. Bond-strength ranges may be approximately 0.001 to 2.5 pounds per inch. The sealing film (38) may be translucent or semi-translucent to allow consumers to view meat product (20) packaged inside the sealed, lid-stock container (28). The lid-stock container (28) and the sealing film (38) may be formed of materials having low gas permeability that inhibit or prevent gases from transferring into and/or out of the meat packaging system (26). In particular, the gas permeability of the lid-stock container (28) and the sealing film (38) may be less than about 100 cc/m$^2$/24 hr. Thus, the modified atmosphere (44) and meat product (20) are effectively sealed inside the lid-stock container (28).

As further shown in FIG. 4, the method of packaging meat (48) comprises "gently touching" or contacting (64) the sealing film (38) with the meat product (20) to provide a reduced-volume headspace (40). See FIGS. 2-3. The "gentle touch" feature (42) prevents movement of the meat product (20) inside the lid-stock container (28). In particular, the "gentle touch" feature (42) prevents the meat product (20) from slipping inside the depression (34) during shipping, storage, and retail display to maintain an attractive appearance for consumers. The reduced-volume headspace (40) is commercially advantageous to both producers and retailers in that it lowers costs and permits a greater utilization of shipping, storage and retail display space. Moreover, the reduced-volume headspace (40) and "gentle touch" feature (42) of the present invention are configured to resemble meat packaging used by in-house butchers at local meat markets to appeal to consumers who desire freshly cut meat(s) as compared to centralized packaging facilities. Thus, the method of packaging meat of the present invention (48) keeps the meat product (20) fresh with an attractive coloration for up to thirty days after packaging.

The modified atmosphere meat packaging system (26) of the present invention and method of packaging meat (48) is universally applicable to all meat manufacturers, producers and retailers, including centralized packaging and in-house butchers for local grocery stores or supermarkets. Furthermore, the meat packaging system (26) of the present invention and method of packaging meat (48) may be compatible with pork, beef, poultry, mutton, lamb, veal and all other types of meats. Although the invention has been described and illustrated with respect to preferred aspects thereof, it is not to be so limited since changes and modifications may be made therein which are within the full intended scope of the invention.

What is claimed is:

1. A modified atmosphere meat package for keeping a meat product fresh during periods of shipping, storage and retail display, the modified atmosphere meat package consisting of:
   a lid-stock container;
   a meat product;
   a modified atmosphere;
   the modified atmosphere consisting of approximately 50-70 vol. % carbon dioxide and 30-50 vol. % nitrogen;
   a sealing film;
   the sealing film consisting of materials having low gas permeability that prevent gases from transferring into and out of the modified atmosphere meat package;
   the sealing film bonded to the lid-stock container;
   a reduced-volume headspace in between the sealing film and the meat product;
   a "gentle touch" feature configured to prevent movement of the meat product inside the lid-stock container during shipping, storage, and retail display;
   spices, salts, rubs and/or seasonings on an entire surface of the meat product or portions thereof; and
   an optional absorbent pad configured to absorb liquids exuded from the meat product during shipping, storage and retail display;
   wherein the spices, salts, rubs and/or seasonings are in between the sealing film and the meat product;
   wherein the meat product and modified atmosphere are sealed inside the lid-stock container.

2. The modified atmosphere meat package of claim 1, the lid-stock container consisting of:
   a) an opening;
   b) a peripheral edge surrounding the opening; and
   c) a depression therein for the placement of the meat product inside the lid-stock container;
   wherein the sealing film is bonded to the peripheral edge of the lid-stock container.

3. The modified atmosphere meat package of claim 2, wherein the lid-stock container and sealing film are formed of materials having low gas permeability;

wherein the lid-stock container and sealing film limit gases from transferring into and/or out of the modified atmosphere meat package.

4. The modified atmosphere meat package of claim 3, wherein the gas permeability of the lid-stock container and the sealing film is less than about 100 cc/m²/24 hr-atm.

5. The modified atmosphere meat package of claim 2, wherein the modified atmosphere does not contain oxygen and carbon monoxide.

6. The modified atmosphere meat package of claim 5, wherein the reduced-volume headspace lowers costs for producers and retailers and permits a greater utilization of shipping, storage and retail display space.

7. The modified atmosphere meat package of claim 5, wherein the meat product extends above the peripheral edge of the lid-stock container.

8. The modified atmosphere meat package of claim 7, wherein the "gentle touch" feature is
configured to provide an attractive appearance of the meat package for consumers.

9. The modified atmosphere meat package of claim 8, wherein the meat product appears freshly cut and packaged locally as opposed to a centralized packaging facility.

10. The modified atmosphere meat package of claim 1, wherein the modified atmosphere consists of approximately 55-65 vol. % carbon dioxide and 35-45 vol. % nitrogen.

11. A modified atmosphere meat package for keeping meat product fresh during periods of shipping, storage and retail display, the modified atmosphere meat package consisting of:
 a meat product;
 a lid-stock container, comprising:
  a) an opening;
  b) a peripheral edge surrounding the opening;
  c) a depression therein for the placement of the meat product inside the lid-stock container; and
  d) the lid-stock container formed of materials having low gas permeability;
 a sealing film consisting of an impermeable gaseous barrier;
 the sealing film bonded to the peripheral edge of the lid-stock container;
 a reduced-volume headspace in between the sealing film and the meat product;
 an optional absorbent pad configured to absorb liquids exuded from the meat product during shipping, storage and retail display;
 a "gentle touch" feature, wherein the "gentle touch" feature:
  a) prevents movement of the meat product inside the lid-stock container during shipping, storage, and retail display; and
  b) maintains an attractive appearance of the modified atmosphere meat package for consumers;
 spices, salts, rubs and/or seasonings placed on an entire surface of the meat product or portions thereof;
 the spices, salts, rubs and/or seasonings in between the sealing film and the meat product;
 a modified atmosphere consisting of approximately 55-65 vol. % carbon dioxide and 35-45 vol. % nitrogen;
 wherein the modified atmosphere does not contain oxygen and carbon monoxide;
 wherein the meat product extends above the peripheral edge of the lid-stock container;
 wherein the lid-stock container and sealing film limit gases from transferring into and out of the modified atmosphere meat package;
 wherein the meat product and modified atmosphere are sealed inside the modified atmosphere meat package;
 wherein the meat product appears freshly cut and packaged locally as opposed to a centralized packaging facility.

* * * * *